UNITED STATES PATENT OFFICE.

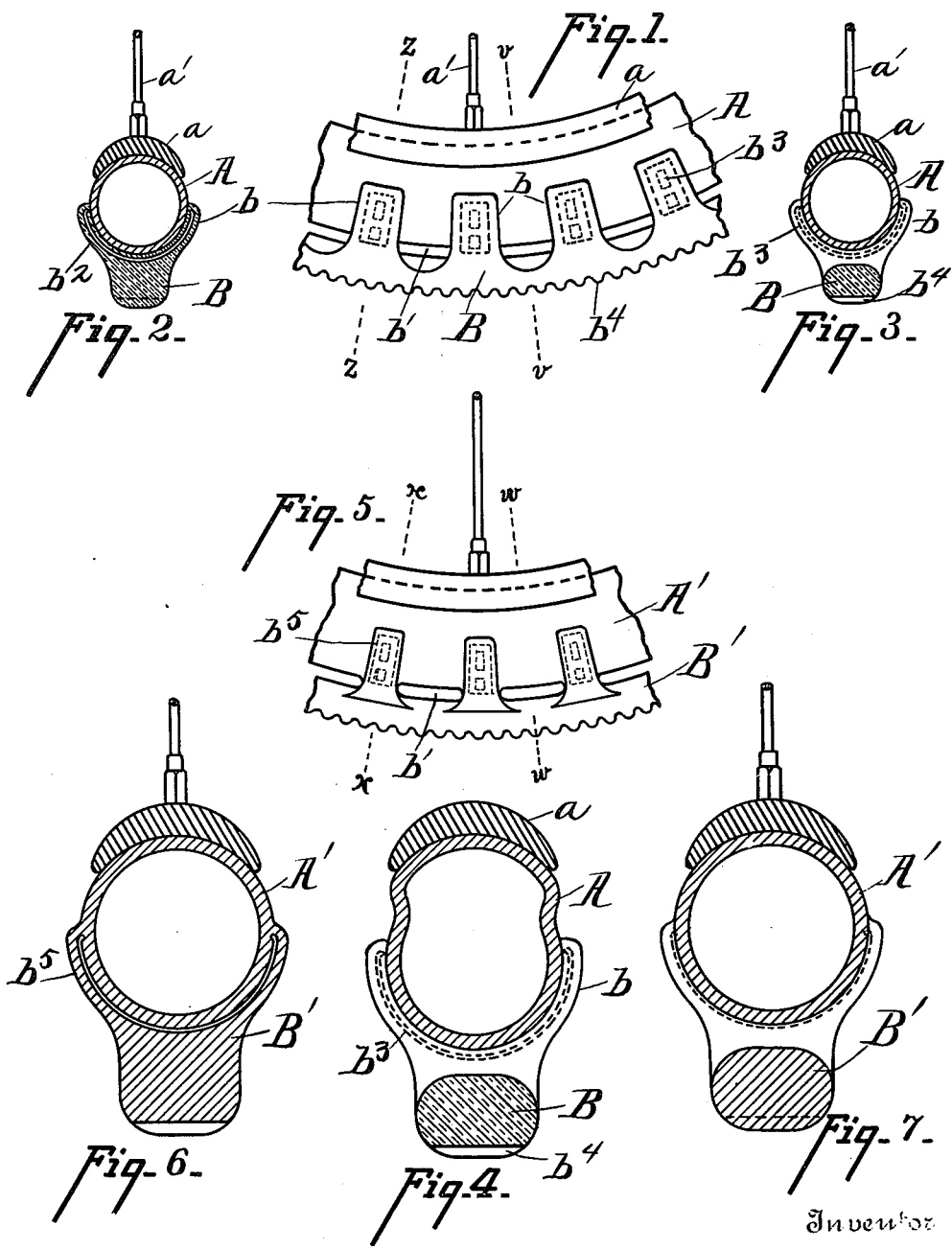

JOHN A. JONES, OF CINCINNATI, OHIO.

PNEUMATIC TIRE.

SPECIFICATION forming part of Letters Patent No. 652,967, dated July 3, 1900.

Application filed January 29, 1900. Serial No. 3,120. (No model.)

*To all whom it may concern:*

Be it known that I, JOHN A. JONES, a citizen of the United States, and a resident of Cincinnati, in the county of Hamilton and State of Ohio, have invented certain new and useful Improvements in Pneumatic Tires, of which the following is a specification.

The object of my invention is to produce a pneumatic tire provided with a sheath for protecting it from puncture which does not decrease the resiliency of the tire and is accomplished by increasing the distance of the pneumatic tube from the tread, but in so doing using as little material as possible between the tread and the tube.

In the accompanying drawings, Figure 1 is a view in side elevation of a part of a pneumatic tire with the protector embodying my invention attached thereto. Fig. 2 is a transverse sectional view of the same, taken upon line $z\ z$ of Fig. 1. Fig. 3 is a similar view taken upon line $v\ v$ of Fig. 1. Fig. 4 is a view similar to Fig. 3, upon a slightly-enlarged scale, showing the shape the protector causes the tire to assume when it is slightly deflated. Fig. 5 is a view similar to Fig. 1, showing a modification in which the protector is formed integral with the pneumatic tube or tire. Fig. 6 is a transverse sectional view of the same, taken upon line $x\ x$ of Fig. 5. Fig. 7 is a similar view taken upon line $w\ w$ of Fig. 5.

Referring to Figs. 1 to 4, inclusive, tire A, rim $a$, and spokes $a'$ are of ordinary construction and need not be specifically described. The tire-protector consists of a hoop B, of rubber, which has inwardly-projecting crescent-shaped flanges $b$ at intervals along its inner circumference to fit against the periphery of tire A, leaving spaces $b'$ between the tire, the hoop, and the flanges. Flanges $b$ have interior grooves or chambers $b^2$ to receive curved springs $b^3$, which cause the flanges to clasp the tire closely. When the tire is somewhat deflated, the springs cause it to assume a shape such as shown in Fig. 4, thereby decreasing the interior capacity of the tube and keeping it hard. The tread of the protector is formed with transverse corrugations $b^4$, which render it when in motion less liable to slip or slide upon the ground. It is obvious that the protector in this form may be applied to any ordinary tire.

The modification shown in Figs. 5, 6, and 7 differs from the form just described only in that the protector B' and flanges $b^5$ are formed integral with tire A'.

It is obvious that by increasing the distance between the pneumatic tube and the tread the danger of puncturing the former is in a large degree obviated, since nails, tacks, &c., cannot reach it to puncture it, that by making the protector contact with the tube only at intervals the resiliency of the tire is not impaired, and that the tendency of the springs to keep the tire hard increases its average resiliency.

What I claim is—

1. In combination with a pneumatic tire, a tire-protector consisting of a hoop of rubber encircling the tire and having inwardly-projecting flanges at intervals along its inner circumference between it and the tire and curved springs seated in the flanges and clasping the pneumatic tube, substantially as shown and described.

2. In a tire-protector the combination of a hoop having inwardly-projecting flanges at intervals along its inner circumference to fit the periphery of a pneumatic tube so as to leave spaces between the tire the hoop and the flanges, and springs seated in the flanges to hold them closely to the tube, substantially as shown and described.

JOHN A. JONES.

Witnesses:
WALTER F. MURRAY,
EMMA LYFORD.